(12) United States Patent
Lee et al.

(10) Patent No.: US 11,398,318 B2
(45) Date of Patent: Jul. 26, 2022

(54) APPARATUS AND METHOD OF EVALUATING RESPONSE TIME OF NUCLEAR PLANT PROTECTION SYSTEM

(71) Applicant: KEPCO ENGINEERING & CONSTRUCTION COMPANY, INC., Gyeongsangbuk-do (KR)

(72) Inventors: Chang Jae Lee, Daejeon (KR); Jae Hee Yun, Daejeon (KR)

(73) Assignee: KEPCO ENGINEERING & CONSTRUCTION COMPANY, INC., Gimcheon-si (KR)

( * ) Notice: Subject to any disclaimer, the term of this patent is extended or adjusted under 35 U.S.C. 154(b) by 1091 days.

(21) Appl. No.: 15/995,258

(22) Filed: Jun. 1, 2018

(65) Prior Publication Data

US 2018/0350475 A1    Dec. 6, 2018

(30) Foreign Application Priority Data

Jun. 2, 2017   (KR) .................. 10-2017-0069086
May 8, 2018   (KR) .................. 10-2018-0052799

(51) Int. Cl.
*G21D 3/06* (2006.01)
*G21C 9/02* (2006.01)
(Continued)

(52) U.S. Cl.
CPC ............ *G21D 3/06* (2013.01); *G21C 9/02* (2013.01); *G21C 17/00* (2013.01); *G21D 3/001* (2013.01);
(Continued)

(58) Field of Classification Search
CPC .......... G21D 3/06; G21D 3/001; G21D 3/007; G21D 3/00; G21D 3/04; G21D 3/08;
(Continued)

(56) References Cited

U.S. PATENT DOCUMENTS 4,517,154 A * 5/1985 Dennis ............... G21D 3/06
                                                376/259
4,752,869 A * 6/1988 Miller ............... G05B 9/03
                                                700/82

(Continued)

FOREIGN PATENT DOCUMENTS

CN   104484740 A * 4/2015  ........... G06Q 10/063
CN   106205755 A * 12/2016 ............. G21D 3/001

OTHER PUBLICATIONS

C J Lee, S M Baek, S J Lee, "Setpoint Methodology Improvement Considering Beyond Basis Events for Safety-Related Instrumentation," IEEE trans Nuclear Science, vol. 61, No. 4, pp. 2120-2130, Aug. 2014.

(Continued)

*Primary Examiner* — Darlene M Ritchie
(74) *Attorney, Agent, or Firm* — Nixon Peabody LLP; Jeffrey L. Costellia (57) ABSTRACT

Provided is an apparatus for evaluating a response time of a plant protection system. The apparatus includes: a classification module classifying a design process related to a response time requirement of each channel performing a safety function into four operations of a safety analysis operation, a system design operation, a response time analysis operation, and a response time test operation; and an integrated evaluation module determining whether a response time evaluation is proper based on a time t1 derived in the safety analysis operation, a time t2 derived in the system design operation, a time t3 derived in the response time analysis operation, and a time t4 derived in the response time test operation.

5 Claims, 6 Drawing Sheets

(51) Int. Cl.
*G21C 17/00* (2006.01)
*G21D 3/00* (2006.01)
*G05B 23/02* (2006.01)

(52) U.S. Cl.
CPC ...... *G05B 23/0254* (2013.01); *G05B 23/0283* (2013.01)

(58) Field of Classification Search
CPC .............. G05B 23/0283; G05B 23/02; G05B 23/0205; G05B 23/0254; G05B 2219/14057; Y02E 30/00; Y02E 30/30; G21C 9/02; G21C 17/00; G01D 2218/10; G06F 11/00
USPC .................................................. 376/277, 278
See application file for complete search history.

(56) References Cited

U.S. PATENT DOCUMENTS

| | | | | |
|---|---|---|---|---|
| 6,460,009 | B1 * | 10/2002 | Rowland | G21D 3/04 702/176 |
| 2005/0182581 | A1 * | 8/2005 | Hashemian | G05B 23/0283 702/105 |
| 2018/0019029 | A1 * | 1/2018 | Kang | G06F 30/20 |

OTHER PUBLICATIONS

S H Yang, S H Kim, Y J Chung, S Q Zee, "Trip setpoint analysis for the reactor protection system of an advanced integral reactor," Annals of Nuclear Energy, vol. 34, No. 4, pp. 319-325, Apr. 2007.
Robert J Dodson, Madeline Anne Feltus, Low temperature overpressurization protection system setpoint analysis using RETRAN for Salem, Annals of Nuclear Energy, vol. 23, No. 6, pp. 487-498, Apr. 1996.
C R Tuley, Richard B Miller, "Westinghouse setpoint methodology for control and protection systems," IEEE trans Nuclear Science, vol. 33, No. 1, pp. 684-687, Feb. 1986.
K I Han, "OPΔT and OTΔT Trip Setpoint Generation Methodology," Journal of the Korean Nuclear Society, vol. 16, No. 2, pp. 106-115, Jun. 1984.
Guidance on Digital Computer Real-Time Performance, USNRC, NUREG 0800, SRP, BTP 7-21, 2007.
Performance Monitoring for Nuclear Safety-Related Instrument Channels in Nuclear Power Plants, ANSI/ISA-67061, 2002.
Periodic Testing of Electric Power and Protection Systems, USNRC Regulatory Guide 1118, Rev 3, Apr. 1995.
IEEE Standard for Criteria for the Periodic Surveillance Testing of Nuclear Power Generating Station Safety Systems, IEEE Std 338, Sep. 10, 1987.
Measurement of Response Time and Detection of Degradation in Pressure Sensor/Sensing Line systems, NUREG/CR-4526, 1985.
Effect of aging on response time of nuclear plant pressure sensors, NUREG/CR 5383, 1989.
B R Upadhyaya, C Mehta, D Bayram, "Integration of Time Series Modeling and Wavelet Transform for Monitoring Nuclear Plant Sensors," IEEE trans Nuclear Science, vol. 61, No. 5, pp. 2628-2635, 2014.
H Kleines, J Sarkadi, F Suxdorf, K Zwoll, "Measurement of real-time aspects of Simatic® PLC operation in the context of physics experiments," IEEE trans Nuclear Science, vol. 51, No. 3, pp. 489-494, 2004.
Y Yasu, M Nomachi, Y Nagasaka, R Ball, Y Tajima, C Timmermans, "UNIDAQ, real-time response of the system," IEEE trans Nuclear Science, vol. 43, No. 1. pp xxx-xxx, 1996.
C J Lee, S Han, J H Yun, S M Baek, "Response Time Evaluation for the PPS Using a Combined Technique of Analysis and Test," Transactions of the Korean Nuclear Society Autumn Meeting, Oct. 2015.
Setpoint for Safety-Related Instrumentation, USNRC Regulatory Guide 1105, Rev 3, Dec. 1999.
Setpoints for Nuclear Safety-Related Instrumentation, ISA-S6704, Part I, Sep. 1994.
Nuclear Power Plants-Instrumentation Important to Safety—Determination and Maintenance of Trip Setpoints, IEC-61888, Aug. 2002.
Nuclear Power Systems (1974, Apr) CESEC Digital Simulation of a Combustion Engineering Nuclear Steam Supply System, CENPD-107, Combustion Engineering Inc, Windsor, CT.

* cited by examiner

FIG. 6

APPARATUS AND METHOD OF EVALUATING RESPONSE TIME OF NUCLEAR PLANT PROTECTION SYSTEM

CROSS-REFERENCE TO RELATED APPLICATIONS

This application claims the benefit of Korean Patent Application Nos. 10-2017-0069086, filed on Jun. 2, 2017, and 10-2018-0052799, filed on May 8, 2018 in the Korean Intellectual Property Office, the disclosures of which are incorporated herein in their entirety by reference.

BACKGROUND

1. Field

One or more embodiments relate to methods of applying an integrated evaluation to each process of safety analysis, system design, response time analysis, and response time test related to the response time requirement of an instrumentation channel performing a safety function of a nuclear power plant.

2. Description of the Related Art

The safety of nuclear power plants directly related to the life and safety of people is the most important consideration in the construction and operation of nuclear power plants. In particular, when an instrumentation system channel performing a safety function in the event of a design standard accident in a nuclear power plant fails to satisfy the response time requirement determined through a safety analysis, the safety of the nuclear power plant may not be ensured.

In the related art, since it is only necessary to verify that a safety analysis response time requirement in the uppermost stage of a design process is satisfied by only a response time test that is the lowermost stage, the suitability of each design process may not be evaluated and thus it may be difficult to ensure the safety of a nuclear power plant.

RELATED ART DOCUMENT

Non-Patent Document

[1] C J Lee, S M Baek, S J Lee, "Setpoint Methodology Improvement Considering Beyond Basis Events for Safety-Related Instrumentation," IEEE trans Nuclear Science, vol 61, no 4, pp 2120-2130, August 2014
[2] S H Yang, S H Kim, Y J Chung, S Q Zee, "Trip setpoint analysis for the reactor protection system of an advanced integral reactor," Annals of Nuclear Energy, vol 34, no 4, pp 319-325, April 2007
[3] Robert J Dodson, Madeline Anne Feltus, "Low temperature overpressurization protection system setpoint analysis using RETRAN for Salem, Annals of Nuclear Energy, vol 23, no 6, pp 487-498, April 1996
[4] C R Tuley, Richard B Miller, "Westinghouse setpoint methodology for control and protection systems," IEEE trans Nuclear Science, vol 33, no 1, pp 684-687, February 1986
[5] K I Han, "OPΔT and OTΔT Trip Setpoint Generation Methodology," Journal of the Korean Nuclear Society, vol 16, no 2, pp 106-115, June 1984
[6] Guidance on Digital Computer Real-Time Performance, USNRC, NUREG 0800, SRP, BTP 7-21, 2007
[7] Performance Monitoring for Nuclear Safety-Related Instrument Channels in Nuclear Power Plants, ANSI/ISA-67061, 2002
[8] Periodic Testing of Electric Power and Protection Systems, USNRC Regulatory Guide 1118, Rev 3, April 1995
[9] IEEE Standard for Criteria for the Periodic Surveillance Testing of Nuclear Power Generating Station Safety Systems, IEEE Std 338, Sep. 10, 1987
[10] Measurement of Response Time and Detection of Degradation in Pressure Sensor/Sensing Line systems, NUREG/CR-4526, 1985
[11] Effect of aging on response time of nuclear plant pressure sensors, NUREG/CR 5383, 1989
[12] B R Upadhyaya, C Mehta, D Bayram, "Integration of Time Series Modeling and Wavelet Transform for Monitoring Nuclear Plant Sensors," IEEE trans Nuclear Science, vol 61, no 5, pp 2628-2635, 2014
[13] H Kleines, J Sarkadi, F Suxdorf, K Zwoll, "Measurement of real-time aspects of Simatic® PLC operation in the context of physics experiments," IEEE trans Nuclear Science, vol 51, no 3, pp 489-494, 2004
[14] Y Yasu, M Nomachi, Y Nagasaka, R Ball, Y Tajima, C Timmermans, "UNIDAQ, real-time response of the system," IEEE trans Nuclear Science, vol 43, no 1, pp xxx-xxx, 1996
[15] C J Lee, S Han, J H Yun, S M Baek, "Response Time Evaluation for the PPS Using a Combined Technique of Analysis and Test," Transactions of the Korean Nuclear Society Autumn Meeting, October 2015
[16] Setpoint for Safety-Related Instrumentation, USNRC Regulatory Guide 1105, Rev 3, December 1999
[17] Setpoints for Nuclear Safety-Related Instrumentation, ISA-S6704, Part I, September 1994
[18] Nuclear Power Plants-Instrumentation Important to Safety—Determination and Maintenance of Trip Setpoints, IEC-61888, August 2002
[19] Nuclear Power Systems (1974, April) CESEC Digital Simulation of a Combustion Engineering Nuclear Steam Supply System, CENPD-107, Combustion Engineering Inc, Windsor, Conn.

SUMMARY

One or more embodiments include ensuring the safety in the event of a design standard accident in a nuclear power plant by solving the related-art limitation of not applying a systematic response time evaluation method to the entire design process of a plant protection system.

One or more embodiments include determining a design problem and improving the safety of a nuclear power plant by applying an integrated evaluation method to each operation of safety analysis, system design, response time analysis, and response time test related to the response time requirement of an instrumentation channel performing a safety function of the nuclear power plant.

Additional aspects will be set forth in part in the description which follows and, in part, will be apparent from the description, or may be learned by practice of the presented embodiments.

According to one or more embodiments, an apparatus for evaluating a response time of a plant protection system includes: a safety analysis module measuring an analytical response time t1 that is a response time of a system performing a safety function; a system design module measuring a designed response time t2 representing a total sum of individual response times allocated to each device constituting an instrumentation channel; a response time analysis module measuring an estimated response time t3 representing a response time quantitatively analyzed in each device constituting the instrumentation channel; and a response time test module dividing each device constituting the instrumentation channel into n regions and measuring a measured response time t4 representing a response time measured overlappingly between the n regions, wherein the apparatus further includes an integrated evaluation module determining that a response time requirement is satisfied in each of the safety analysis module, the system design module, the response time analysis module, and the response time test module when t4<t3<t2<t1 are all satisfied.

According to an embodiment, the apparatus may sequentially determine whether t1>t2 is satisfied, whether t2>t3 is satisfied, and whether t3>t4 is satisfied.

According to an embodiment, when t1−t2=M1, t2−t3=M2, and t3−t4=M3, the integrated evaluation module may determine whether a first condition of M1>0, M2>0, and M3>0 and a second condition of t1=t4+M1+M2+M3 are both satisfied.

According to one or more embodiments, a method of performing a response time evaluation in a response time evaluation apparatus of a plant protection system includes: classifying a design process related to a response time requirement of each channel performing a safety function into four operations of safety analysis, system design, response time analysis, and response time test; measuring an analytical response time t1 that is a response time of a system performing a safety function in the safety analysis operation; measuring a designed response time t2 representing a total sum of individual response times allocated to each device constituting an instrumentation channel in the system design process; measuring an estimated response time t3 representing a response time quantitatively analyzed in each device constituting the instrumentation channel in the response time analysis operation; dividing each device constituting the instrumentation channel into n regions and measuring a measured response time t4 representing a response time measured overlappingly between the n regions; determining, when t1−t2=M1, t2−t3=M2, and t3−t4=M3, whether M1>0, M2>0, and M3>0 are sequentially satisfied; and determining whether t1=t4+M1+M2+M3 is satisfied.

According to one or more embodiments, an apparatus for evaluating a response time of a plant protection system includes: a classification module classifying a design process related to a response time requirement of each channel performing a safety function into four operations of a safety analysis operation, a system design operation, a response time analysis operation, and a response time test operation; and an integrated evaluation module determining whether a response time evaluation is proper based on a time t1 derived in the safety analysis operation, a time t2 derived in the system design operation, a time t3 derived in the response time analysis operation, and a time t4 derived in the response time test operation.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Hereinafter, embodiments of the present disclosure will be described with reference to the accompanying drawings. In the specification and drawings, like reference numerals may denote like elements. In the following description, detailed descriptions of well-known functions or configurations will be omitted since they would unnecessarily obscure the subject matters of the present disclosure.

Figure 1:
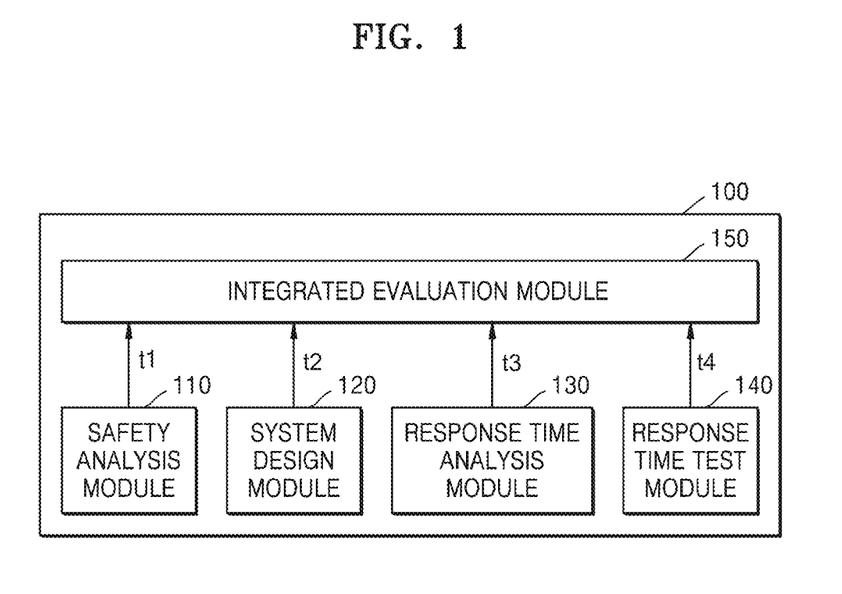
FIG. 1 illustrates an internal configuration diagram of a response time evaluation apparatus 100 of a plant protection system according to an embodiment.

FIG. 1 illustrates an internal configuration diagram of a response time evaluation apparatus 100 of a plant protection system according to an embodiment.

According to an embodiment, the response time evaluation apparatus 100 of a plant protection system may be applied to a response time-related design process of an instrumentation system channel performing a safety function of reactor shutdown and engineering safety equipment operation in Korean standard nuclear power plants, OPR1000, APR1400 nuclear power plants, and all domestic nuclear power plants, and to various other nuclear power plant design processes.

The plant protection system performs two safety functions of reactor shutdown and engineering safety equipment operation. An instrumentation channel for a reactor shutdown function includes a transmitter, a signal converter, a plant protection system, and a reactor trip switchgear system. An instrumentation channel for an engineering safety equipment operation function includes a transmitter, a signal converter, a plant protection system, an engineering safety equipment control system, and a final drive. Each safety function may have four multi-instrumentation channels, and the suitability of each channel may be determined according to the response time requirement test requirements in accordance with the periodic inspection requirements of technical guidelines for operation.

According to an embodiment, the response time evaluation apparatus 100 of a plant protection system may classify a design process related to the response time requirement of each channel performing a safety function into four operations of safety analysis, system design, response time analysis, and response time test through a classification module (not illustrated), and each design process may be implemented in a safety analysis module 110, a system design module 120, a response time analysis module 130, and a response time test module 140.

The safety analysis module 110 may measure an analytical response time t1 that is a response time of a system performing a safety function.

The system design module 120 may measure a designed response time t2 representing the total sum of individual response times allocated to each device constituting an instrumentation channel. The designed response time t2 may be calculated as Equation 1.

$$t2 = \sum_{i=1}^{m} RT_{Allocated}(i) \quad \text{Equation 1}$$

In this case, i denotes each device constituting the instrumentation channel, m denotes the total number of devices constituting the instrumentation channel, and $RT_{Allocated}(i)$ denotes a response time allocated to an ith device constituting the instrumentation channel. RTOverlapped(k) denotes an overlappingly measured response time of a kth device.

The response time analysis module 130 may measure an estimated response time t3 representing a response time quantitatively analyzed in each device constituting the plant protection system. The estimated response time t3 may be calculated as Equation 2.

$$t3 = \sum_{j=1}^{n} RT_{Quantified}(j) \quad \text{Equation 2}$$

In this case, j denotes each device constituting the plant protection system, n denotes the total number of devices constituting the plant protection system, and $RT_{Quantified}(j)$ denotes a quantitatively analyzed response time of a jth device. RTOverlapped(k) denotes an overlappingly measured response time of a kth device.

The response time test module 140 may divide each device constituting the instrumentation channel into n regions and measure a measured response time t4 representing a response time measured overlappingly between the n regions. The measured response time t4 may be calculated as Equation 3.

$$t4 = \sum_{k=1}^{o} RT_{Overlapped}(k) \quad \text{Equation 3}$$

Herein, k denotes a grouping region of each device constituting the instrumentation channel and o denotes the number of grouping regions.

Figure 6:
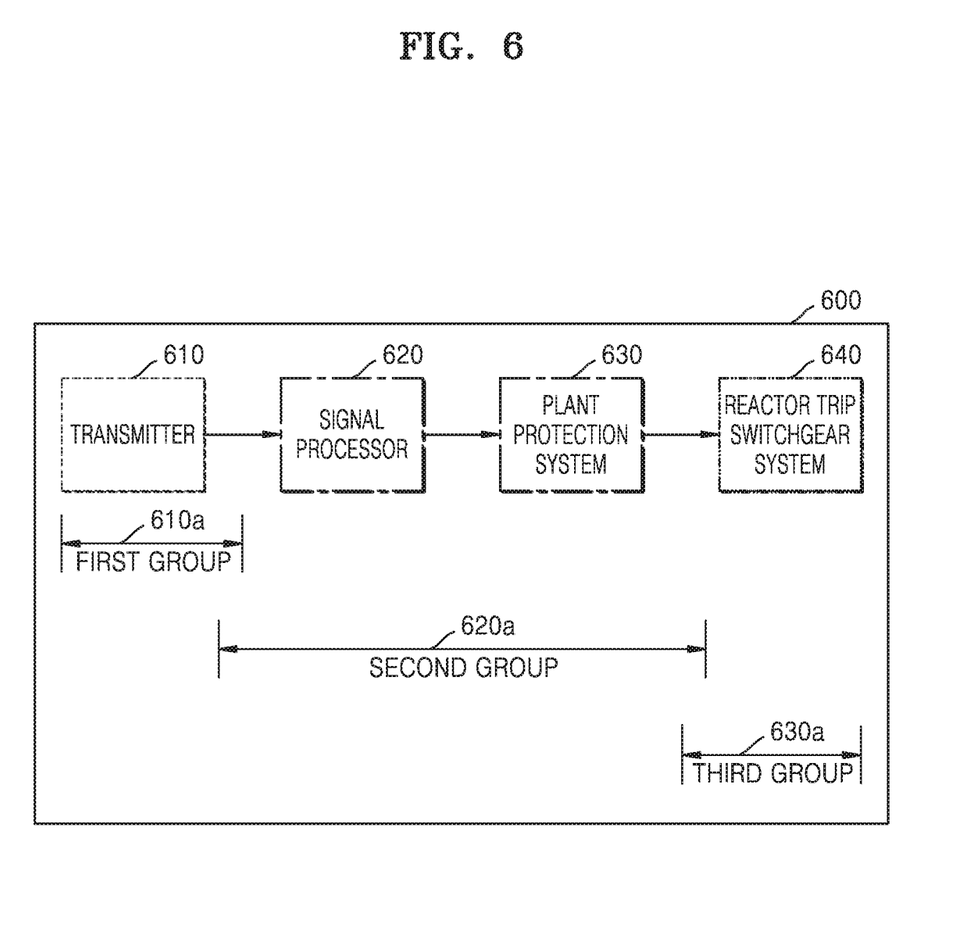
FIG. 6 illustrates an example of evaluating response time of a plant protection system of an APR 1400 nuclear power plant according to another embodiment.

Referring to FIG. 6, when the devices constituting the instrumentation channel are a transmitter 610, a signal processor 620, a plant protection system 630, and a reactor trip switchgear system 640, the transmitter 610 may be grouped as a first group, the signal processor 620 and the plant protection system 630 may be grouped as a second group, and the reactor trip switchgear system 640 may be grouped as a third group. Thereafter, the measured response time t4 may be calculated by summing the response times measured overlappingly between a response time 610a of the first group, a response time 620a of the second group, and a response time 630a of the third group.

According to an embodiment, the response time evaluation apparatus 100 of a plant protection system may further include an integrated evaluation module 150 determining that a response time requirement is satisfied in each of the safety analysis module 110, the system design module 120, the response time analysis module 130, and the response time test module 140. According to an embodiment, the integrated evaluation module 150 may be implemented in hardware through a processor or the like.

Figure 2:
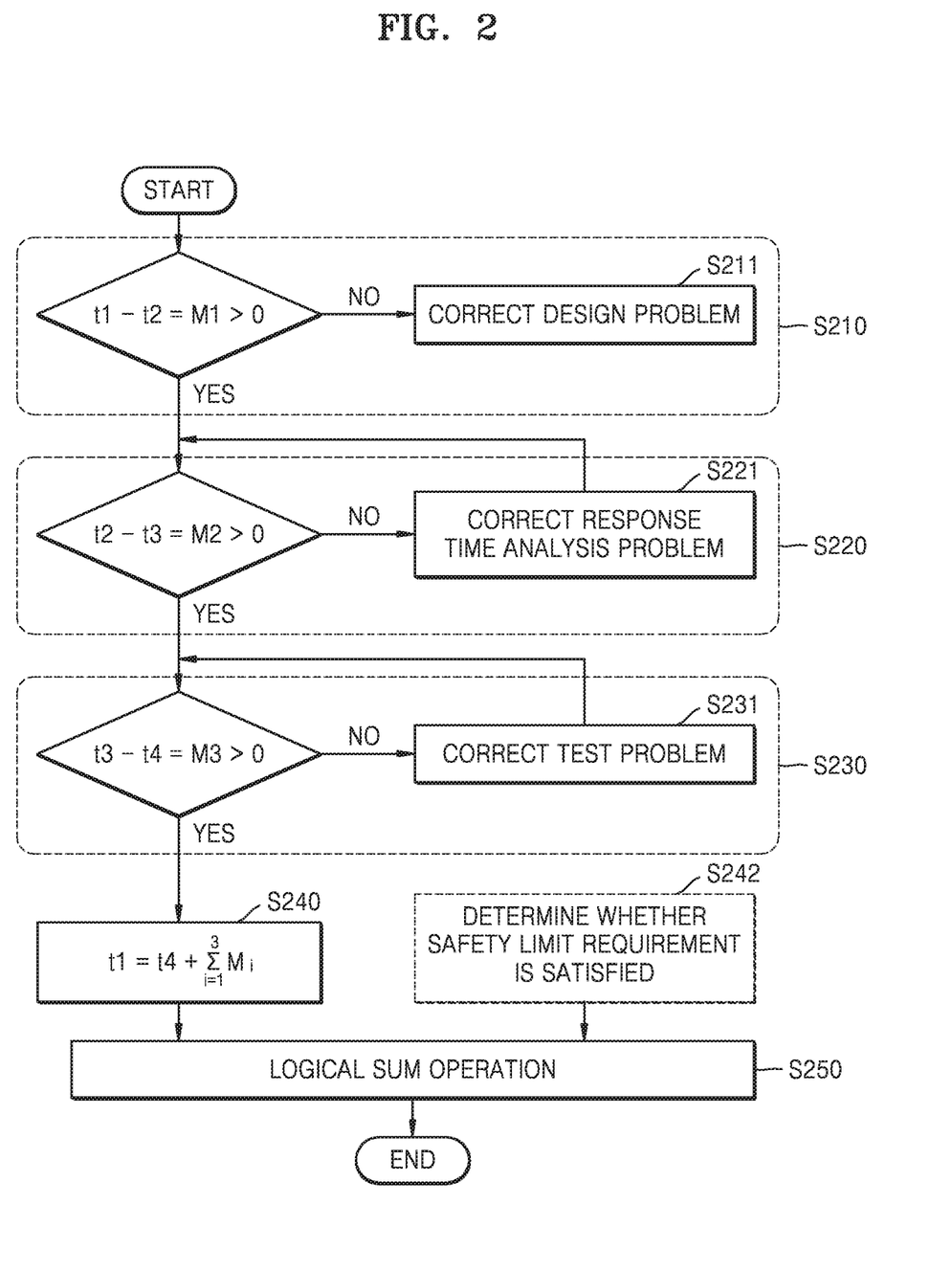
FIG. 2 illustrates a flowchart for evaluating the response time of a plant protection system according to an embodiment.

The integrated evaluation module 150 may sequentially determine whether t1>t2 is satisfied, whether t2>t3 is satisfied, and whether t3>t4 is satisfied. Referring to FIG. 2, when t1−t2=M1 (S210), t2−t3=M2 (S220), and t3−t4=M3 (S230), if a first condition of M1>0, M2>0, and M3>0 (S210, S220, S230) and a second condition of t1=t4+M1+M2+M3 (S240) are both satisfied, the integrated evaluation module 150 may determine that a response time requirement is sequentially satisfied in each of the safety analysis module 110, the system design module 120, the response time analysis module 130, and the response time test module 140.

When a condition of t1−t2=M1>0 (S210) is not satisfied, the integrated evaluation module 150 may correct a design problem of the instrumentation channel (S211). Next, when a condition of t2−t3=M2>0 (S220) is not satisfied, the problem of a response time analysis is corrected (S221). Also, when a condition of t3−t4=M3>0 (S230) is not satisfied, the problem of a test is corrected (S231).

Figure 3:
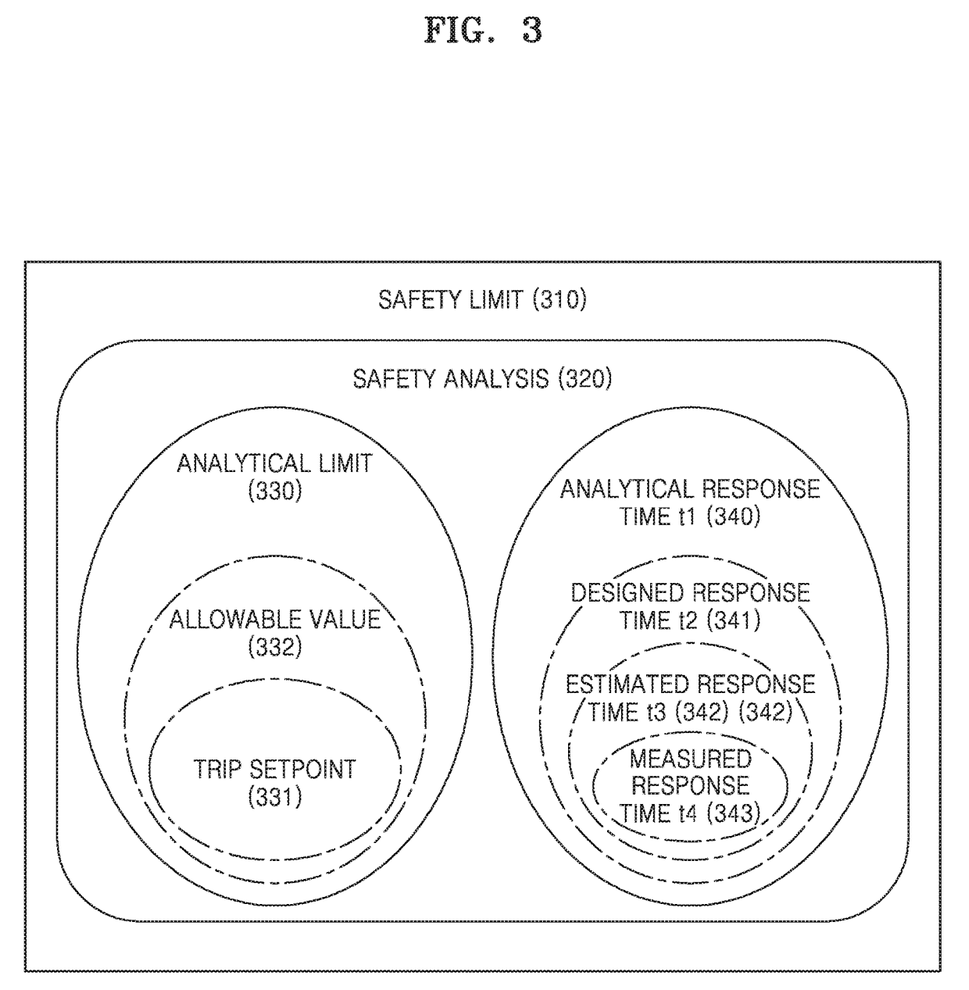
FIG. 3 illustrates the relationship between a safety limit and a safety analysis according to an embodiment.

According to another embodiment, when the second condition (S240) is satisfied, the integrated evaluation module 150 may further determine whether a safety limit requirement (S242) illustrated in FIG. 3 is satisfied through a logical sum operation (S250). The response time evaluation apparatus 100 of the plant protection system may determine that the response time evaluation has passed when the second condition (S240) and the safety limit requirement (S242) are satisfied.

FIG. 3 illustrates an example of the relationship between a safety limit 310 and a safety analysis 320 according to an embodiment.

The safety limit 310 may be a value ensuring the physical integrity of a device preventing the leakage of a radioactive material in the event of a nuclear power plant accident. The safety analysis 320 may determine an analytical limit 330 and an analytical response time t1 340 ensuring that the process variable does not exceed the safety limit in the event of a nuclear power plant accident.

According to an embodiment, the analytical limit 330 may determine a trip setpoint 331 considering the uncertainty of an instrumentation system channel from the analysis limitation based on the safety-related instrument setpoint determination methodology, and an allowable value 332 defined as a limit in which the trip setpoint 331 may change during a test period may be determined considering a period test error in a trip setpoint.

According to an embodiment, the suitability of the analytical response time t1 340 may be sequentially and integrally evaluated by a designed response time t2 341 determined at the time of system design as the uppermost requirement for the response time of a system performing a safety function, an estimated response time t3 342 determined at the time of system analysis, and a measured response time t4 343 determined at the time of system test.

Figure 4:
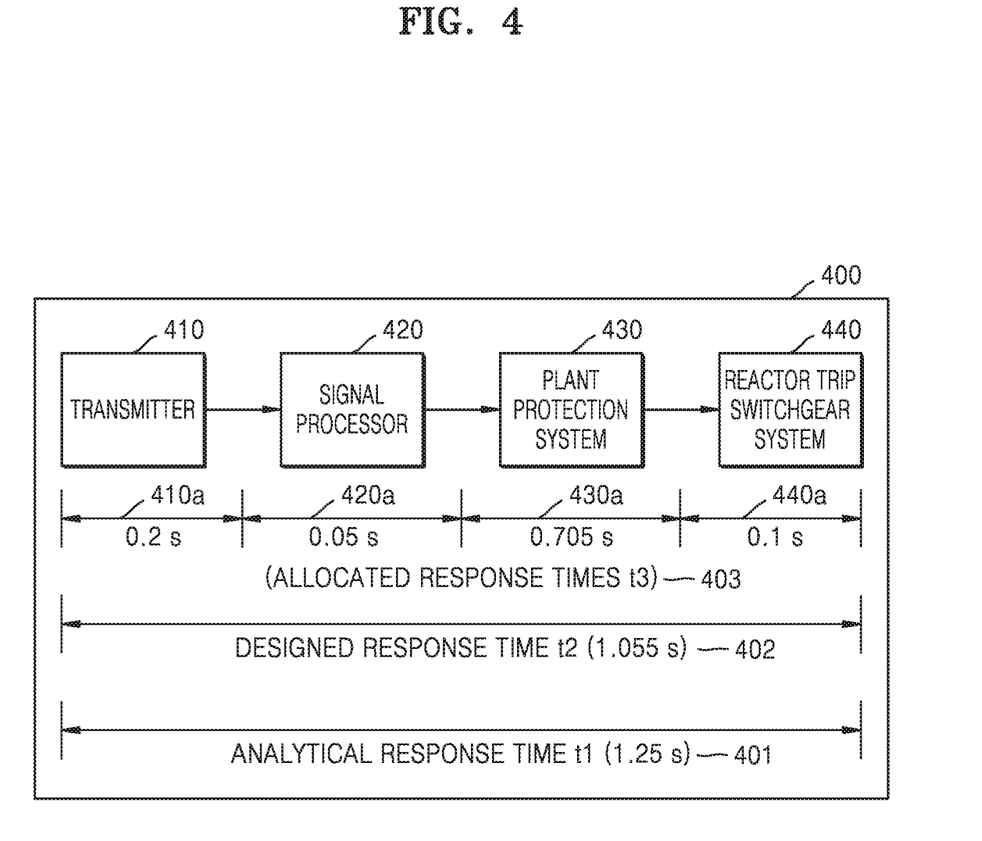
FIGS. 4 and 5 illustrate an example of evaluating the response time of a plant protection system of an APR1400 nuclear power plant in a response time evaluation apparatus of a plant protection system according to an embodiment.

FIG. 4 illustrates an example of applying a response time evaluation apparatus of a plant protection system to an APR1400 nuclear power plant according to an embodiment.

An example of obtaining an analytical response time t1 in a safety analysis module is as follows.

The most restrictive design standard accidents requiring a steam generator low-level reactor shutdown function in the APR1400 nuclear power plant are a condenser vacuum loss and a water pipe breakage. In the case of a condenser vacuum loss, the safety analysis limit used in the safety analysis may be 40.7%, and the analytical response time t1 may be 1.25 seconds (s).

This may mean that a reactor shutdown may be initiated at a steam generator level of 40.7% in the event of a condenser vacuum loss, and a safety analysis allowable standard may be satisfied when a reactor is shut down after 1.25 seconds.

Also, in the case of a water pipe breakage, the analytical limit used in the safety analysis may be 28.4%, and the analytical response time t1 may be 1.25 seconds. This may mean that a reactor shutdown may be initiated at a steam generator level of 28.4% in the event of a water pipe breakage, and a safety analysis allowable standard may be satisfied when a reactor is shut down after 1.25 seconds. Thus, the analytical response time t1 of a steam generator low-level reactor shutdown function of the APR1400 nuclear power plant may be 1.25 seconds (401), which may be the uppermost requirement for a plant protection system channel.

An example of obtaining a designed response time t2 in a system design module is as follows.

As illustrated in FIG. 4, a plant protection system channel 400 performing a steam generator low-level reactor shutdown function of the APR1400 nuclear power plant may include a transmitter 410, a signal processor 420, a plant protection system 430, and a reactor trip switchgear system 440. In order to verify whether the system design satisfying an analytical response time t1 of 1.25 seconds has been performed, it may be necessary to verify whether the total sum of the response times allocated to each component satisfies the analytical response time requirement. By verifying through a design specification that the response times allocated to the respective components are 0.2 seconds (410a), 0.05 seconds (420a), 0.705 seconds (430a), and 0.1 seconds (440a) (403), it may be verified that the designed response time t2 is 1.055 seconds (402) and this value satisfies an analytical response time t1 of 1.25 seconds. Thus, it may be verified that the system design satisfying the requirement for the analytical response time t1 has been performed.

An example of obtaining an estimated response time t3 in a response time analysis module is as follows.

Referring to FIG. 4, it may be verified that the estimated response time t3 by the response time analysis is 0.2 seconds (410a) of a transmitter, 0.05 seconds (420a) of a signal processor, 0.705 seconds (430a) of a plant protection system, and 0.1 seconds (440a) of a reactor trip switchgear system, a total sum thereof is 0.992 seconds, and this satisfies a designed response time t2 of 1.055 seconds. Thus, it may be verified through the response time analysis that the estimated response time t3 satisfies the designed response time t2.

Figure 5:
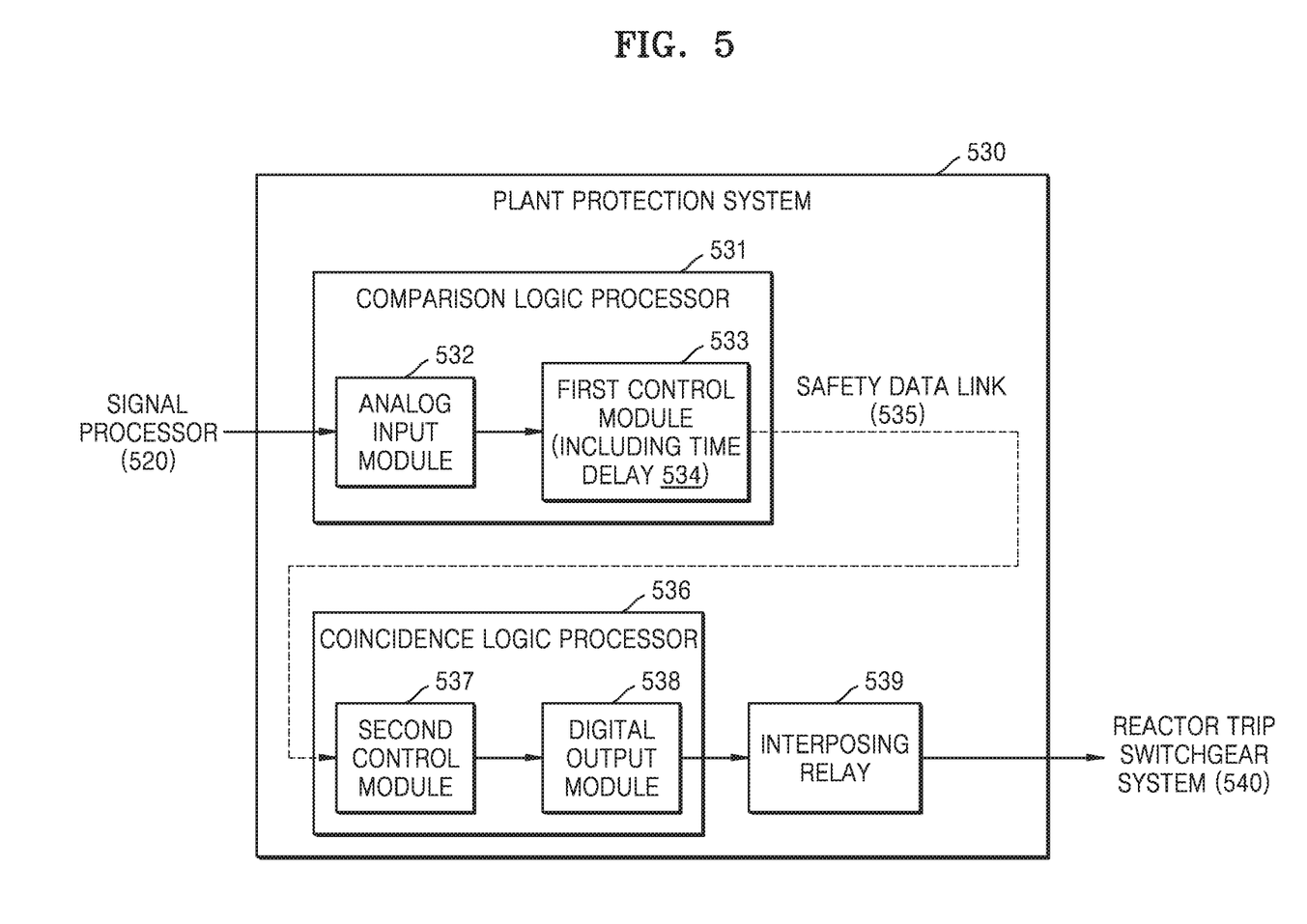

However, as illustrated in FIG. 5, the plant protection system 430 of the APR1400 nuclear power plant may include a comparison logic processor 531 and a coincidence logic processor 536. Since the comparison logic processor 531 and the coincidence logic processor 536 include a software processor (not illustrated) and various other components such as an analog input module 532, a first control module 533, a time delay 534, a second control module 537, a digital output module 538, a safety data link 535, and an interposing relay 539, a separate analysis thereof may be required as in Table 1.

TABLE 1

| Components | Channel Response Time (s) |
|---|---|
| Analog Input Module (532) | 0.02 |
| First Control Module (533) | 0.058 |
| Time Delay (534) | 0.48 |
| Safety Data Link (535) | 0.013 |
| Second Control Module (537) | 0.034 |
| Digital Output Module (538) | 0.012 |
| Interposing Relay (539) | 0.025 |
| Total Response Time | 0.642 |
| Response Time Requirement | 0.705 |

As for the other components (410, 420, and 440 in FIG. 4), without performing a separate analysis thereof, it may be verified that each design requirement satisfies the response time through the device design and device manufacturer specifications.

A process of calculating a measured response time t4 in a response time test module is as follows.

A response time test for a plant protection system channel performing a steam generator low-level reactor shutdown function of the APR1400 nuclear power plant may be performed by grouping and overlapping three groups 610a, 620a, and 630a, as illustrated in FIG. 6. It may be verified whether the sum of the test results in each section satisfies the estimated response time t3 that is the response time analysis result.

Tables 2 and 3 describe the response time test results for a first steam generator and a second steam generator with respect to each of channels A, B, C, and D. It may be verified that the measured response time t4 for each channel, which is the response time test result of each channel, satisfies the estimated response time t3.

TABLE 2

| | Channel Response Time (s) | | | |
|---|---|---|---|---|
| Components | CH. A | CH. B | CH. C | CH. D |
| Transmitter (610a) | 0.091 | 0.055 | 0.104 | 0.120 |
| Signal Processor and Plant Protection System (620a) | 0.610 | 0.609 | 0.614 | 0.615 |
| Reactor Trip Switchgear System (630a) | 0.084 | 0.084 | 0.084 | 0.084 |
| Measured Response Time t4 | 0.785 | 0.748 | 0.802 | 0.819 |
| Estimated Response Time t3 | 0.992 | | | |
| Designed Response Time t2 | 1.055 | | | |
| Analytical Response Time t1 | 1.250 | | | |

TABLE 3

| Components | Channel Response Time (s) | | | |
| --- | --- | --- | --- | --- |
| | CH. A | CH. B | CH. C | CH. D |
| Transmitter (610a) | 0.066 | 0.064 | 0.076 | 0.075 |
| Signal Processor and Plant Protection System (620a) | 0.603 | 0.620 | 0.618 | 0.619 |
| Reactor Trip Switchgear System (630a) | 0.084 | 0.084 | 0.084 | 0.084 |
| Measured Response Time t4 | 0.753 | 0.768 | 0.778 | 0.778 |
| Estimated Response Time t3 | 0.992 | | | |
| Designed Response Time t2 | 1.055 | | | |
| Analytical Response Time t1 | 1.250 | | | |

Although Tables 1 to 3 illustrate an example of applying the response time evaluation method of the present disclosure to the APR1400 nuclear power plant, the present disclosure is not limited thereto and the response time may be evaluated based on the analytical response time, the designed response time, the estimated response time, and the measured response time of the response time-related design process result of the instrumentation system channel performing a safety function in Korean standard nuclear power plants, OPR1000, and all domestic nuclear power plants.

The present disclosure may also be embodied as computer-readable code on a computer-readable recording medium. The computer-readable recording medium may be any data storage device that may store data that may be thereafter read by a computer system.

Examples of the computer-readable recording medium may include read-only memories (ROMs), random-access memories (RAMs), compact disk read-only memories (CD-ROMs), magnetic tapes, floppy disks, and optical data storage devices. The computer-readable recording medium may also be distributed over network-coupled computer systems so that the computer-readable code may be stored and executed in a distributed fashion.

The response time evaluation apparatus and method of the plant protection system proposed in the present disclosure may ensure the safety of the nuclear power plant by sequentially and integrally evaluating the problems in the response time design process of the instrumentation system channel performing a safety function, and may improve the economical efficiency of the nuclear power plant by preventing unnecessary operation stopping by detecting the problems during the operation thereof.

Example embodiments have been described above with reference to the drawings. Although particular terms are used herein, they are only used to describe the present disclosure and are not intended to limit the scope of the present disclosure defined by the following claims.

Therefore, those of ordinary skill in the art will understand that various modifications and other equivalent embodiments may be derived therefrom. Thus, the spirit and scope of the present disclosure should be defined by the appended claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus including a processor for evaluating a response time of a plant protection system in a nuclear power plant, the apparatus, comprising:
   a safety analysis circuitry in the processor that measures an analytical response time t1 that is a response time of a system performing a safety function;
   a system design circuitry in the processor that measures a designed response time t2 representing a total sum of individual response times allocated to each device of a plurality of devices constituting an instrumentation channel;
   a response time analysis circuitry in the processor that measures an estimated response time t3 representing a response time quantitatively analyzed in each device constituting the instrumentation channel;
   a response time test circuitry in the processor that divides each device constituting the instrumentation channel into n grouping regions and measures a measured response time t4 representing a response time measured over the n grouping regions including an overlap, where the overlap is provided at an edge of the adjacent regions; and
   an integrated evaluation circuitry in the processor to determine that a response time requirement is satisfied in each of the safety analysis circuitry, the system design circuitry, the response time analysis circuitry, and the response time test circuitry when t4<t3<t2<t1 are all satisfied,
   wherein the apparatus sequentially determines whether t1>t2 is satisfied, whether t2>t3 is satisfied, and whether t3>t4 is satisfied,
   wherein the devices constituting the instrumentation channel comprise a transmitter, a signal processor, the plant protection system, and a reactor trip switchgear system,
   wherein the measured response time t4 is calculated as $$t4 = \sum_{k=1}^{n} RT_{Overlapped}(k)$$

where k denotes a grouping region of each device constituting the instrumentation channel and n denotes the number of grouping regions, and RToverlapped (k) denotes a measured response time of a kth device having an overlap, and wherein the transmitter, the signal processor, the plant protection system, and the reactor trip switchgear system constituting the instrumentation channel are divided into three grouping regions such that a first grouping region is the transmitter, a second grouping region is the signal processor and the plant protection system, and a third grouping region is the reactor trip switchgear system.

2. The apparatus of claim 1, wherein, when t1−t2=M1, t2−t3=M2, and t3−t4=M3, the integrated evaluation circuitry determines whether a first condition of M1>0, M2>0, and M3>0 and a second condition of t1=t4+M1+M2+M3 are both satisfied.

3. The apparatus of claim 1, wherein the designed response time t2 is calculated as $$t2 = \sum_{i=1}^{m} RT_{Allocated}(i),$$

where i denotes each device constituting the instrumentation channel, m denotes a total number of devices constituting the instrumentation channel, and $RT_{Allocated}(i)$ denotes a response time allocated to an ith device constituting the instrumentation channel.

4. The apparatus of claim 1, wherein the estimated response time t3 is calculated as $$t3 = \sum_{j=1}^{n} RT_{Quantified}(j),$$

where j denotes each device constituting the instrumentation channel, n denotes a total number of devices constituting the instrumentation channel, and $RT_{Quantified}(j)$ denotes a quantitatively analyzed response time of a jth device.

5. The apparatus of claim 4, wherein the plant protection system among the devices constituting the instrumentation channel comprises a comparison logic processor and a coincidence logic processor that execute software.

* * * * *